UNITED STATES PATENT OFFICE.

GEORGE SEIBERT, OF WHEELING, WEST VIRGINIA.

MEDICAL COMPOUND.

SPECIFICATION forming part of Letters Patent No. 294,687, dated March 4, 1884.

Application filed August 24, 1883. (No specimens.)

*To all whom it may concern:*

Be it known that I, GEORGE SEIBERT, a citizen of the United States, and a resident of Wheeling, in the county of Ohio and State of West Virginia, have discovered a certain new and useful Medical Compound; and I do hereby declare that the following is a full, clear, and exact description thereof, which will enable others skilled in the art to which it appertains to make and use the same.

My invention or discovery relates to internal remedies; and it consists in the following ingredients, viz: three tea-spoonfuls of pulverized sulphur, so-called "flour of sulphur;" three tea-spoonfuls of pulverized charcoal, preferably willow charcoal; two tea-spoonfuls of refined sugar; two tea-spoonfuls of dried lemon-rind, and one tea-spoonful of sulphate of quinia. Mix these ingredients and divide so as to make twelve powders, which have been used with success in cases of climatic fevers usual in low countries close to the sea and in hot climates, taking the powders in the following manner:

Four powders are taken dissolved in very hot and very strong infusion of chamomile-flowers, and taken with two hours' interval between each powder. The next four powders are taken in the same manner with four hours' interval, and the last four powders are taken with six hours' interval.

I am aware that all the ingredients named have been used in different compounds, and that several of the ingredients have been used together for different purposes; but I am not aware that all the ingredients have been used in the same proportions and administered in the same manner.

I therefore claim—

The herein-described compound, consisting of pulverized sulphur, pulverized charcoal, refined sugar, lemon-rind, and sulphate of quinia, in the proportions specified.

In testimony that I claim the foregoing as my own I have hereunto affixed my signature in presence of two witnesses.

GEORGE SEIBERT.

Witnesses:
LOUIS FEINLER,
CHRISTIAN LIEDL.